UNITED STATES PATENT OFFICE.

FERDINAND FRITSCHE, OF RUMBURG, AUSTRIA-HUNGARY, ASSIGNOR TO THE FIRM OF STOLLE AND KOPKE, OF RUMBURG, AUSTRIA-HUNGARY.

PROCESS FOR THE PRODUCTION OF A SOLUBLE GUM.

No. 900,274.  Specification of Letters Patent.  Patented Oct. 6, 1908.

Application filed January 13, 1908. Serial No. 410,648.

*To all whom it may concern:*

Be it known that I, FERDINAND FRITSCHE, a subject of the Emperor of Austria-Hungary, and resident of Rumburg, in the Empire of Austria-Hungary, have invented a certain new and useful Process for the Production of a Soluble Gum, of which the following is an exact specification.

The present invention relates to gums insoluble in water such as algæ or lichen, which by means of an addition of a small quantity of perborate are transformed into a soluble form. The products referred to are well known in commerce as East Indian gum, Bassorine gum, insoluble gum and so on. Further the products called traganthin gum, agar-agar, carrageen-moss, Iceland-moss and the like may also be treated with perborates and produce similar results.

The product according to the present invention is used as an impregnating means in the finishing of cloth or the like.

The most of the above mentioned natural products are employed in a thickened mass in printing establishments in the finishing of woven goods. The products are prepared by first soaking them in cold water and then boiling same under increase of pressure for 10-12 hours.

One of the above mentioned products, the agar-agar has been made soluble by treating same with ozone. Such a proceeding however is rather expensive and as only a few textile establishments are equipped with ozonizing plants and as such factories taken collectively constitute the largest consumers of insoluble gums, the process forming the object of the present invention is particularly adapted for such works.

The production of perborates is carried out on lines as fully described in my copending application, Serial No. 410650, filed January 13, 1908. Though all such prepared perborates contain borax, said addition does no harm, if said perborate is employed for the purpose of finishing textile wares, on the contrary, it in a measure promotes the desired effect. The use of perborates reduces the time required for the boiling manipulation considerable and moreover it produces a far more soluble end product than any prior proceeding.

The perborate employed may have the following formula:

$$NaBO_3 + Na_2B_4O_2 + 14H_2O.$$

The perborates are employed in the following way: The natural gum product algæ or the like is soaked in a solution of perborate, when it is afterwards heated under addition of water until the whole solution attains the required thickness. As a rule the quantity of perborate employed amounts to 1 per cent. of the weight of the gum-product selected. The resulting product is a soluble gum.

I claim:—

1. A soluble gum consisting of an insoluble gum product, such as algæ or lichen, said product being soaked in a diluted perborate solution and afterwards heated.

2. Process for the production of a soluble gum consisting in soaking an insoluble gum product, such as algæ or lichen, in a diluted perborate solution, heating the same under addition of water until the required thickness of the solution is obtained, substantially as described.

In witness whereof I have hereunto set my hand in the presence of two witnesses.

FERDINAND FRITSCHE.

Witnesses:
 ADOLF ELGE,
 FRANZ SIMON.